US009276492B2

(12) United States Patent
De Vaal

(10) Patent No.: US 9,276,492 B2
(45) Date of Patent: Mar. 1, 2016

(54) CIRCUIT TO KEEP ELECTRONIC TRANSFORMERS WORKING WHILE UNDER-LOADED

(71) Applicant: Marulaled (Pty) Limited, Diep Rivier (ZA)

(72) Inventor: Gerardus Geertruud De Vaal, Kenilworth (ZA)

(73) Assignee: Marulaled (Pty) Limited, Diep Rivier (ZA)

( * ) Notice: Subject to any disclaimer, the term of this patent is extended or adjusted under 35 U.S.C. 154(b) by 0 days.

(21) Appl. No.: 14/424,593

(22) PCT Filed: Aug. 30, 2013

(86) PCT No.: PCT/IB2013/058172
§ 371 (c)(1),
(2) Date: Feb. 27, 2015

(87) PCT Pub. No.: WO2014/033684
PCT Pub. Date: Mar. 6, 2014

(65) Prior Publication Data
US 2015/0256100 A1    Sep. 10, 2015

(30) Foreign Application Priority Data
Aug. 30, 2012  (GB) .................................. 1215412.6

(51) Int. Cl.
*H05B 37/02*  (2006.01)
*H02M 7/06*   (2006.01)
*H05B 33/08*  (2006.01)

(52) U.S. Cl.
CPC ............. *H02M 7/06* (2013.01); *H05B 33/0809* (2013.01); *H05B 33/0815* (2013.01); *Y02B 20/347* (2013.01); *Y02B 20/383* (2013.01)

(58) Field of Classification Search
USPC .......... 315/185 R, 200 R, 224, 225, 291, 307, 315/308
See application file for complete search history.

(56) References Cited

U.S. PATENT DOCUMENTS

| 4,933,798 | A | * | 6/1990 | Widmayer | H05B 41/3924 315/248 |
|---|---|---|---|---|---|
| 5,371,438 | A | * | 12/1994 | Bobel | 315/200 R |
| 5,416,388 | A | * | 5/1995 | Shackle | 315/219 |
| 2010/0134049 | A1 | | 6/2010 | Matsuoka et al. | |
| 2010/0320840 | A1 | | 12/2010 | Fridberg | |
| 2012/0033471 | A1 | | 2/2012 | Newman, Jr. | |

FOREIGN PATENT DOCUMENTS

WO   WO-2008/053501  A1   5/2008

* cited by examiner

*Primary Examiner* — Jimmy Vu
(74) *Attorney, Agent, or Firm* — Novak Druce Connolly Bove + Quigg LLP

(57) ABSTRACT

An LED light source includes a sub-circuit (24) that is connectable via terminals (12,13) to an electronic transformer and to a powered circuit including at least one LED (4). The sub-circuit (24) includes a sub-circuit rectifier (1a, 1b, 1c, 1d) that is connectable to the transformer (25), and a constant current regulator (7) and a sub-circuit capacitor (6) that are connected parallel to the sub-circuit rectifier (1a, 1b, 1c, 1d).

20 Claims, 3 Drawing Sheets

CIRCUIT TO KEEP ELECTRONIC TRANSFORMERS WORKING WHILE UNDER-LOADED

CROSS REFERENCE TO RELATED APPLICATIONS

This application is a National Phase filing under 35 USC. §371 of PCT/IB2013/058172 filed on Aug. 30, 2013; and this application claims priority to Application No. 1215412.6 filed in United Kingdom on Aug. 30, 2012 under 35 U.S.C. §119. The entire contents of each application are hereby incorporated by reference.

FIELD OF THE INVENTION

The present invention relates to electronic circuits for low loads, such as light emitting diode (LED) light sources. More particularly, the invention relates to a sub-circuit which allows LED light sources to be powered by electronic transformer with minimum power ratings that are higher than the power drawn by the LED light sources. However, the present invention is not limited to LED light sources and can be used more widely, to keep electronic transformer working.

BACKGROUND TO THE INVENTION

LED light sources are often used to replace low voltage (12V) halogen lamps in order to save energy, but problems may occur when LED light sources replace halogen lamps and are connected to existing electronic transformers.

Electronic transformers contain a high-frequency oscillator feeding an isolation transformer which powers a connected load, such as a halogen lamp or an LED light source. The load needs to draw sufficient power from the electronic transformer in order for the transformer to turn on and supply power, i.e. the transformer needs to be sufficiently loaded. Typically, electronic transformers for 12V halogen lamps are rated to operate with loads of 20-70 W and the halogen lamps are typically supplied with 20 W or 50 W power ratings. However, LED light sources that replace halogens typically draw far less power than 20 W, with the result that the transformers are under loaded.

Electronic transformers cease to supply power if the connected load is below a minimum level. When connected to an electronic transformer, LED light sources initially present the transformer with a sufficient load to turn the transformer on. However, following an initial inrush power, the LED light source draws less power than the minimum requirements of the electronic transformer (i.e. presents a low load) and hence the transformer turns off and ceases to supply power.

Depending on the particular electronic transformer, it may or may not turn on (re-ignite) again to supply power, with the result that the LED either receives no power (i.e. malfunctions completely) or the cycle described above is repeated and the LED flickers.

Most attempts to address the problem with under-loaded transformers are based on booster circuits followed by buck regulators. These booster circuits lower the impedance presented to the transformer. These circuits contain inductors, switches and some logic circuits like PWM generators, which cause the circuits to be costly and bulky. Further, the high switching causes EMI related problems. U.S. 20110115400 A1 discloses an example of such a booster circuit.

Other solutions attempt to ignite transformers by feeding pulsed currents back into the transformer in order to re-ignite the transformer. These solution also require logic circuitry and bulky capacitors in order to feed high enough current back to the transformer in order to re-ignite such transformer. EMI issues could occur as high current re-ignition pulses flow between LED light and transformer. U.S. Pat. No. 6,433,493 discloses an example of feed back to re-ignite a transformer.

The present invention seeks to keep electronic transformers functioning under low load conditions, to provide power to LED light sources, while avoiding shortfalls such as visible flickering, high costs, and bulk.

SUMMARY OF THE INVENTION

According to the present invention there is provided an electrical device that includes a sub-circuit, said sub-circuit including first connecting means configured for connecting the sub-circuit to at least one electronic transformer and second connecting means configured for connecting the sub-circuit to at least one powered circuit;
wherein the sub-circuit includes:
   at least one sub-circuit rectifier that is connectable to the electronic transformer via the first connecting means and that is configured to supply DC to the second connecting means;
   a constant current regulator connected to the second connecting means; and
   a sub-circuit capacitor that is connected parallel to the constant current regulator.

The powered circuit is any circuit that is intended to be driven by power from the electronic transformer and can include LEDs, LED drivers, or any other circuitry or components that require power.

The first and second connection means need not be terminals, connectors, or the like, but can be any electrical conducting means.

The sub-circuit may be an analogue circuit and the term "analogue" refers herein to electronic circuits that do not include logic or switching elements.

The constant current regulator and sub-circuit capacitor may be configured such that the sub-circuit capacitor can be discharged by the constant current regulator at a rate high enough for said discharges to occur at a frequency that is higher than what is visually perceptible and/or to change between low and high impedance multiple times during the power cycle of a source of AC power that is connected to the first connecting means.

The sub-circuit may form part of an electronic circuit with the powered circuit and the powered circuit may include at least one LED, i.e. the sub-circuit may be integrated into an electronic circuit of an LED light source.

The powered circuit may be connected to the second connecting means.

The electronic circuit may include a buffer capacitor connected parallel to the powered circuit and the buffer capacitor may be substantially larger than the sub-circuit capacitor.

The electronic circuit may include at least one anti reverse-current diode connected between the sub-circuit and the powered circuit.

The electronic circuit may include at least one power circuit rectifier, connected parallel to the sub-circuit rectifier and one or two diodes may be shared between the power circuit rectifier, and said sub-circuit rectifier.

The sub-circuit capacitor may have a value of less than 1 µF—preferably about 470 nF.

The constant current regulator may be configured to regulate current at about 20 mA and/or may be of the type NSI 45020.

BRIEF DESCRIPTION OF THE DRAWINGS

For a better understanding of the present invention, and to show how the same may be carried into effect, the invention will now be described by way of non-limiting example, with reference to the accompanying drawings in which.

DETAILED DESCRIPTION OF THE DRAWINGS

Figure 1:
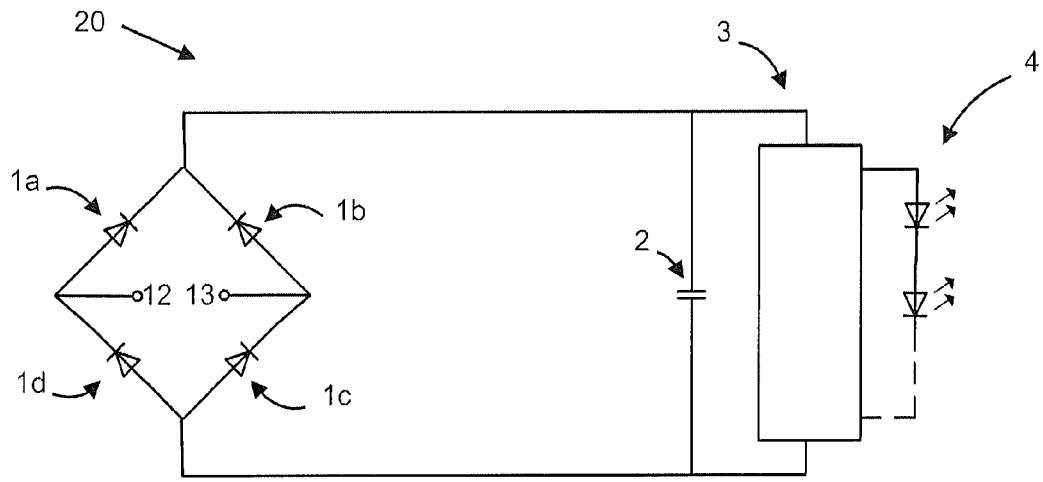
FIG. 1 is a circuit diagram of an LED light source according to the prior art, configured to receive power from an electronic transformer.
Figure 7:
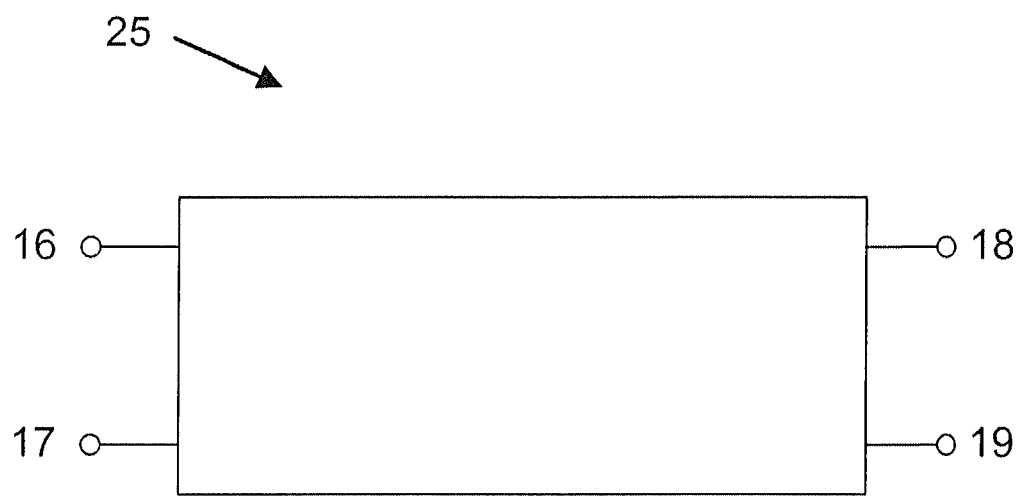
FIG. 7 shows a diagrammatic representation of an electronic transformer for providing power to any of the LED light sources shown in FIGS. 1 to 4 and 6.

Referring to FIGS. 1 and 7, a circuit for a low voltage (12V) LED light source according to the prior art is identified generally by reference number 20 and typically includes a bridge rectifier comprising diodes 1a, 1b, 1c, 1d, a buffer capacitor 2, an LED driver 3 and LEDs 4 connected as shown in FIG. 1. The terminals 12 and 13 of the bridge rectifier 1a, 1b, 1c, 1d are connected to a low voltage AC power supply and the rectifier converts the power and supplies DC power to the rest of the circuit 20. FIG. 7 shows an electronic transformer 25 with two high voltage input terminals 16, 17 and two low voltage output terminals 18, 19 that are connected to the terminals 12, 13 of the bridge rectifier 1a, 1b, 1c, 1d of circuit 20 shown in FIG. 1.

When power is initially supplied to the circuit 20, the impedance of the LED driver 3 is high and the impedance of the buffer capacitor 2 is low, with the result that current is diverted to charge the buffer capacitor 2. As current through the LEDs 4 increases, the impedance of the driver 3 decreases and as the buffer capacitor 2 is charged, its impedance increases, with the result that the buffer capacitor 2 serves to buffer the load of the LEDs 4 and LED driver 3. The buffer capacitor 2 also serves to supply some power to the LED driver 3 when power from the transformer 25 and rectifier ceases, thus evening the power supply to LED driver 3.

If the low voltage AC power source is an electronic transformer 25 such as shown in FIG. 7, the load of the LEDs 4 and LED driver 3 on the transformer is often less than the lower limit of the transformer's operational range and the light source can malfunction or flicker as described herein above. Typically, the transformer 25 ceases power supply and starts attempting about every millisecond to re-ignite (when using typical 50 or 60 Hz mains AC power supply).

Figure 2:
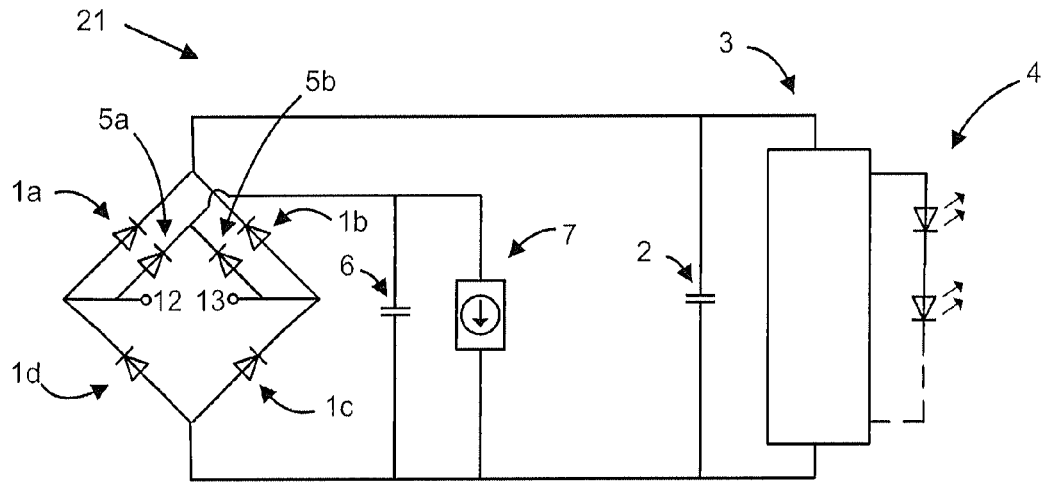
FIG. 2 is a circuit diagram of a first embodiment of an LED light source according to the present invention.
Figure 3:
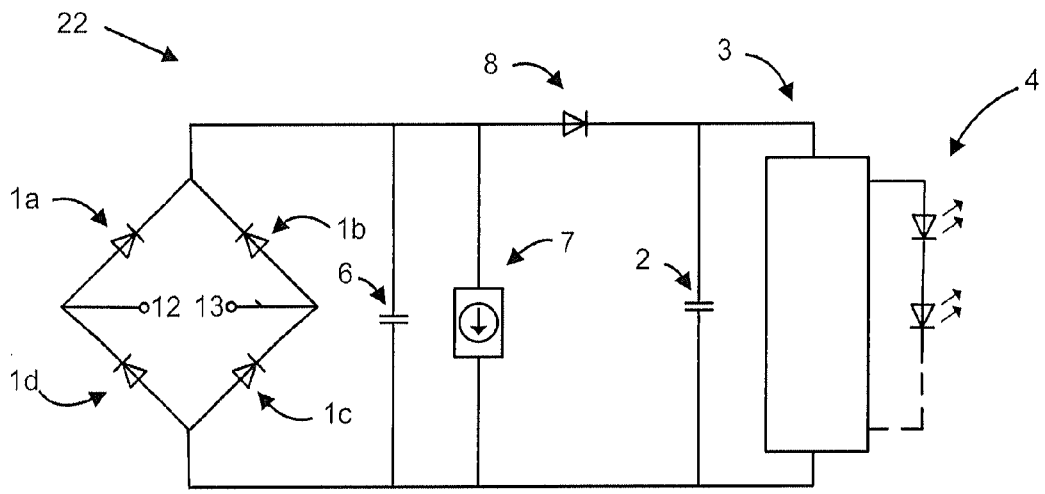
FIG. 3 is a circuit diagram of a second embodiment of an LED light source according to the present invention.
Figure 4:
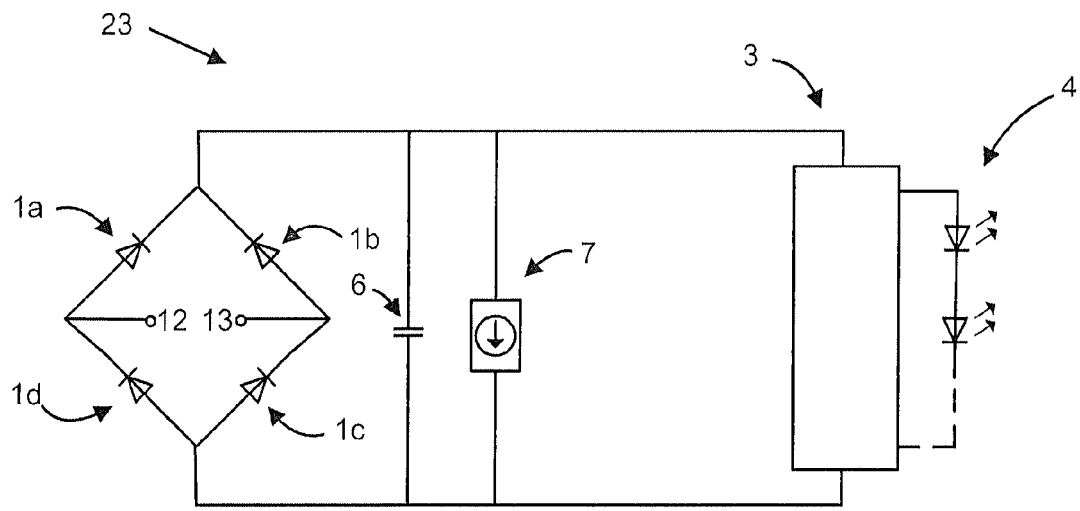
FIG. 4 is a circuit diagram of a third embodiment of an LED light source according to the present invention.

In FIG. 2, a first embodiment of a circuit for an LED light source according to the present invention is identified generally with reference number 21, whereas FIGS. 3 and 4 show alternative embodiments of such circuits, with fewer components, identified generally with reference numbers 22 and 23. The circuits 21, 22, 23 shown in FIGS. 2 to 4 each include the features of the circuit 20 of FIG. 1, with additional components and components that are common between any of these circuits are identified by the same reference numerals.

Referring to FIG. 2, two additional diodes 5a, 5b, a sub-circuit capacitor 6 and a constant current regulator 7 are included in the circuit 21. The diodes 5a and 5b form a sub-circuit full bridge rectifier by sharing diodes 1c and 1d from the rectifier of the original power circuit 20 of FIG. 1. By sharing these diodes, the component count of the circuit 21 is minimized. Since the sub-circuit capacitor 6 and constant current regulator 7 are powered from the second bridge rectifier 5a, 5b, 1c, 1d, sub-circuit capacitor 6 can only be discharged by the constant current regulator 7 and cannot be charged by the buffer capacitor 2.

The constant current regulator 7 continuously drains sub-circuit capacitor 6. If an electronic transformer 25 supplying AC power to the rectifiers is off, constant current source 7 discharges sub-circuit capacitor 6, which decreases the voltage across sub-circuit capacitor 6. A discharged sub-circuit capacitor 6 presents a low impedance (high load) to the transformer 25. Hence the transformer turns on.

If the transformer 25 is switched on, current from rectifier 5a, 5b, 1c, 1d charges sub-circuit capacitor 6 while the constant current regulator 7 is discharging it, thereby maintaining the voltage across the sub-circuit capacitor. As a result, the transformer 25 is presented with a high impedance (low load). As long as the LED light source (i.e. circuit 21) continues to draw sufficient power from the electronic transformer 25, the transformer stays on. Otherwise, the electronic transformer 25 turns off repeating the above cycle.

The equivalent resistance of the constant current regulator 7 gets lower as the voltage across the sub-circuit capacitor 6 drops. This is a characteristic of a constant current regulator. This is an important difference when compared to prior art circuits (not shown) were conventional resistors are used instead of a constant current regulator 7. The constant current regulator 7 has a high resistance when the electronic transformer 25 supplies power and the voltage across sub-circuit capacitor 6 is maintained. This high resistance results in low power losses across the constant current regulator 7. If using a conventional resistor instead of a constant current regulator 7, a low resistor value would be required to achieve similar discharge times, which would result in high power losses in the resistor when the transformer is on.

When the transformer 25 ceases to supply power, the equivalent resistance of the constant current regulator 7 decreases as the voltage across sub-circuit capacitor 6 decreases. This reduced equivalent resistance of the constant current regulator 7 results in a fast discharge time of sub-circuit capacitor 6. A fast discharge time means that the voltage over sub-circuit capacitor 6 reaches a low enough voltage 11 (as shown in FIG. 5) quickly, which causes the transformer 25 to re-ignite.

The constant current regulator 7 could, for example, be of the type NSI 45020 from ON Semiconductor, or similar.

Sub-circuit capacitor 6 should have a low equivalent series resistance (ESR), preferably smaller than 10 milliohm, so as to present a low impedance to the electronic transformer 25 when the sub-circuit capacitor is drained. A low audible noise capacitor, like a tantalum capacitor, can also be used to avoid audible noise, as the sub-circuit capacitor 6 is charged and discharged rapidly in the audible frequency range.

Figure 5:
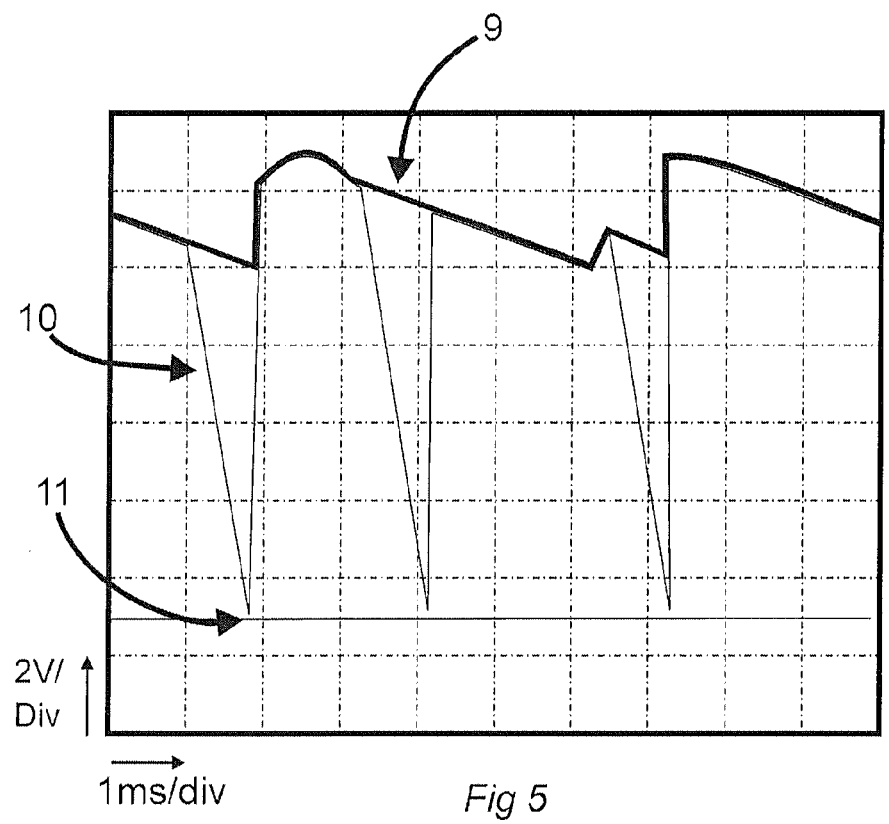
FIG. 5 shows the voltage waveforms over the sub-circuit capacitor and the buffer capacitor, respectively, for the circuit shown in FIG. 2

The value (storage potential) of sub-circuit capacitor 6 should be kept low (e.g. less than 1 μF—typically 470 nF) to ensure fast charge and discharge times 10 (as shown in FIG. 5) of this capacitor, and as a result, fast re-ignition rates of the electronic transformer 25 supplying power to buffer capacitor 2, LED driver 3 and LEDs 4. With a sufficiently low value sub-circuit capacitor 6, re-ignition times of the electronic transformer 25 will occur multiple times per 50 or 60 Hz mains supply cycle and this increased frequency of re-ignition results in a reduction in transformer off time and also reduces ripple 9 in buffer capacitor 2 (as shown in FIG. 5), which, in turn, can provide more consistent power to LED driver 3 and LEDs 4. This is a very substantial improvement over the prior art where re-ignition occurred once every 50 or 60 Hz half cycle. The increased re-ignition frequency of the electronic transformer 25 also reduces its likelihood of being visually perceived.

An alternative (second) embodiment of a circuit 22 in accordance with the present invention is shown in FIG. 3. In this embodiment, the diodes 5a and 5b forming the second bridge rectifier, have been omitted and an additional anti-reverse current diode 8 has been added, when compared to the circuit 21 of FIG. 2. The anti-reverse current diode 8 performs the same function in the circuit 22 shown in FIG. 3, as the diodes 5a and 5b in the circuit 21 shown in FIG. 2, to ensure that the sub-circuit capacitor 6 can only be discharged by the constant current regulator 7 and cannot be charged by the buffer capacitor 2.

The circuit 22 shown in FIG. 3 has one component less than the circuit 21 shown in FIG. 2, which results in a cost saving, but additional losses occur in the circuit 22 shown in FIG. 3, because the entire supply current to the LEDs 4 flows through anti reverse-current diode 8. The configuration shown in FIG. 3 could be beneficial in cost sensitive applications in which energy losses are less of a priority.

Referring to FIG. 4, in a third embodiment of a circuit 23 in accordance with the present invention, the buffer capacitor 2 and the reverse diode 8 have been omitted, when compared to the circuit 22 shown in FIG. 3. This embodiment of the invention is thus even more cost effective than that shown in FIG. 3 and benefits from the increased frequency of transformer re-ignition, but does not have the benefit of the buffer capacitor 2 to even power supplied to the LED driver 3. However, since the frequency with which the electronic transformer 25 re-ignites, is higher than what is visually perceptible, the light emitted from the LEDs 4 is perceived as a constant glow.

Figure 6:
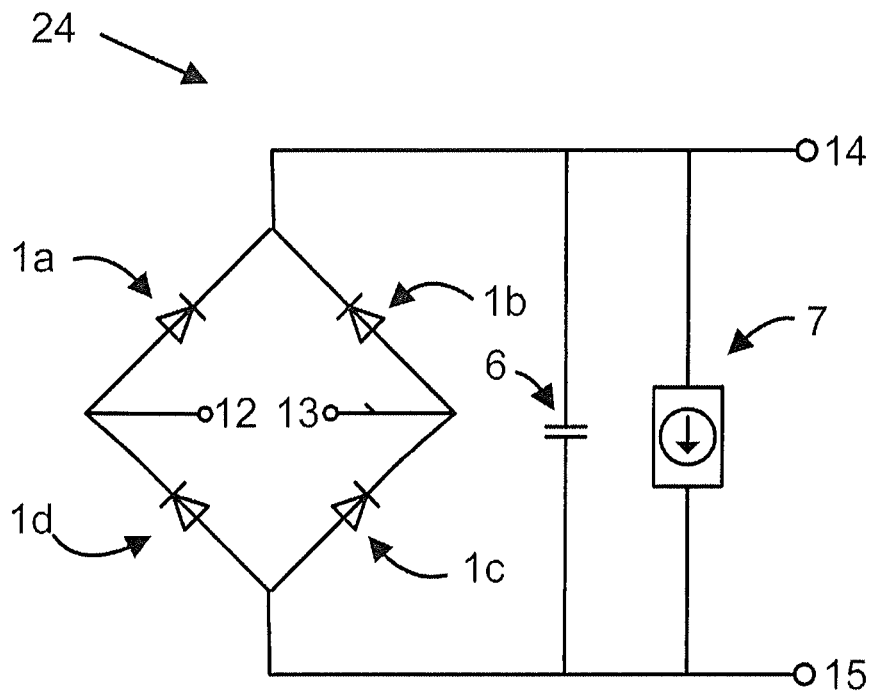
FIG. 6 shows a sub-circuit according to the present invention, that is common to the embodiments of LED light sources shown in FIGS. 2 to 4.

FIG. 6 shows an analogue activating sub-circuit 24 that is common to each of the circuits 21, 22, 23 shown in FIGS. 2 to 4. However, the diodes 1a and 1b of the bridge rectifier shown in FIG. 6, are numbered 5a and 5b in FIG. 2. In each of the embodiments shown in FIGS. 2 to 4, the sub-circuit 24 forms part of the circuit 21, 22, 23 of a LED light source, but the sub-circuit 24 could be used in further embodiments of the present invention.

In a fourth embodiment of the present invention, the AC input terminals 12, 13 of the sub-circuit 24 are connected to the output terminals 18, 19 of an electronic transformer 25, to keep the transformer working, to supply power to any other circuit that can be connected to the output terminals 18, 19 of the transformer.

In a fifth embodiment of the present invention, the sub-circuit 24 is contained in a separate component (i.e. it is not included in the internal circuitry of a LED light source). The AC input terminals 12, 13 of the sub-circuit 24 are connected to the output terminals 18, 19 of an electronic transformer 25 and output terminals 14, 15 are connected to one or more LED drivers and LEDs thus effectively forming the same circuit as circuit 23 shown in FIG. 4, except that the sub-circuit 24 is separate from the LED light source. Similarly, the output terminals 14, 15 of the sub-circuit 24 can be connected to supply power to powered circuits other than LED drivers 3 and LEDs 4.

The invention claimed is:

1. An electrical device that includes a sub-circuit, said sub-circuit including first connectors configured for connecting the sub-circuit to at least one electronic transformer and second connectors whereby the sub-circuit is connected to at least one powered circuit, said sub-circuit forming part of an electronic circuit with the powered circuit;

wherein said sub-circuit includes:
    at least one sub-circuit rectifier that is connectable to the electronic transformer via the first connectors and that is configured to supply DC to the second connectors; a constant current regulator connected to the second connectors; and a sub-circuit capacitor that is connected parallel to the constant current regulator;
wherein said electronic circuit includes a buffer capacitor connected parallel to the powered circuit; and
wherein said electronic circuit includes at least one anti reverse current diode connected between the sub-circuit and the powered circuit.

2. The electrical device according to claim 1, wherein said electronic circuit includes at least one power circuit rectifier, connected parallel to the sub-circuit rectifier.

3. The electrical device according to claim 2, wherein at least one diode is shared between said power circuit rectifier, and said sub-circuit rectifier.

4. The electrical device according to claim 3, wherein two diodes are shared between said power circuit rectifier, and said sub-circuit rectifier.

5. The electrical device according to claim 1, wherein said constant current regulator and sub-circuit capacitor are configured such that the sub-circuit capacitor is discharged by the constant current regulator at a rate high enough for said discharges to occur at a frequency that is higher than what is visually perceptible.

6. The electrical device according to claim 1, wherein said constant current regulator and sub-circuit capacitor are configured to change between low and high impedance multiple times during the power cycle of a source of AC power, when said AC power source is connected to the first connectors.

7. The electrical device according to claim 1, wherein said powered circuit includes at least one LED and the sub-circuit is integrated into an electronic circuit of an LED light source.

8. The electrical device according to claim 1, wherein said buffer capacitor is substantially larger than the sub-circuit capacitor.

9. The electrical device according to claim 1, wherein the sub-circuit capacitor has a value of less than 1 µF.

10. The electrical device according to claim 9, wherein the sub-circuit capacitor has a value of about 470 nF.

11. The electrical device according to claim 9 wherein said constant current regulator is configured to regulate current at about 20 mA.

12. The electrical device according to claim 11, wherein said constant current regulator is of the type NSI 45020.

13. The electrical device according to claim 10, wherein said constant current regulator is configured to regulate current at about 20 mA.

14. The electrical device according to claim 13, wherein said constant current regulator is of the type NSI 45020.

15. The electrical device according to claim 2, wherein said buffer capacitor is substantially larger than the sub-circuit capacitor.

16. The electrical device according to claim 3, wherein said buffer capacitor is substantially larger than the sub-circuit capacitor.

17. The electrical device according to claim 2, wherein said powered circuit includes at least one LED and the sub-circuit is integrated into an electronic circuit of an LED light source.

18. The electrical device according to claim 3, wherein said powered circuit includes at least one LED and the sub-circuit is integrated into an electronic circuit of an LED light source.

19. The electrical device according to claim 2, wherein said buffer capacitor is substantially larger than the sub-circuit capacitor.

20. The electrical device according to claim 3, wherein said buffer capacitor is substantially larger than the sub-circuit capacitor.

\* \* \* \* \*